United States Patent
Stage et al.

(10) Patent No.: US 11,685,525 B2
(45) Date of Patent: Jun. 27, 2023

(54) PLUMBING VENT CAP REMOTE REMOVAL SYSTEM

(71) Applicants: Michael A. Stage, Springboro, OH (US); Daniel H. Woeste, IV, Fairfield, OH (US)

(72) Inventors: Michael A. Stage, Springboro, OH (US); Daniel H. Woeste, IV, Fairfield, OH (US)

(73) Assignee: Testcap LLC, Springboro, OH (US)

( * ) Notice: Subject to any disclaimer, the term of this patent is extended or adjusted under 35 U.S.C. 154(b) by 696 days.

(21) Appl. No.: 16/695,300

(22) Filed: Nov. 26, 2019

(65) Prior Publication Data
US 2021/0155345 A1    May 27, 2021

(51) Int. Cl.
*B64D 1/00*      (2006.01)
*F16L 55/115*    (2006.01)
*B64C 39/02*     (2023.01)
*B64U 10/13*     (2023.01)
*B64U 101/00*    (2023.01)

(52) U.S. Cl.
CPC .............. *B64D 1/00* (2013.01); *B64C 39/024* (2013.01); *F16L 55/115* (2013.01); *B64U 10/13* (2023.01); *B64U 2101/00* (2023.01); *B64U 2201/20* (2023.01)

(58) Field of Classification Search
CPC ......... B64C 39/024; B64D 1/00; F16L 55/115
USPC ...................................................... 137/15.01
See application file for complete search history.

(56) References Cited

U.S. PATENT DOCUMENTS

| | | | |
|---|---|---|---|
| 5,520,219 A * | 5/1996 | Hessian | G01M 3/022 138/90 |
| 7,347,218 B1 | 3/2008 | Reimer et al. | |
| 2004/0078878 A1* | 4/2004 | Gadtke | E03C 1/1225 4/218 |
| 2006/0081300 A1* | 4/2006 | Schmalz | F16L 55/115 138/90 |
| 2019/0152600 A1* | 5/2019 | Kuk | B66C 1/34 |

* cited by examiner

*Primary Examiner* — Peter D Nolan
*Assistant Examiner* — Luke Huynh
(74) *Attorney, Agent, or Firm* — R. William Graham

(57) ABSTRACT

A system, method and apparatus for removing a test seal part from a vent positioned on a roof of a structure and being removable without requiring a person on site to accomplish the same includes a test seal part having a surface for connection enabling removal, wherein the seal part removably sealably connects to the plumbing vent pipe, and a remote controlled apparatus and/or remote controller directly or indirectly removes the test seal part. The remote controlled apparatus can includes an unmanned aerial vehicle (UAV) or a powered actuator having a receiver operably disposed adjacent the seal part in manner to actuate the seal part out of sealable connection with the vent pipe.

19 Claims, 4 Drawing Sheets

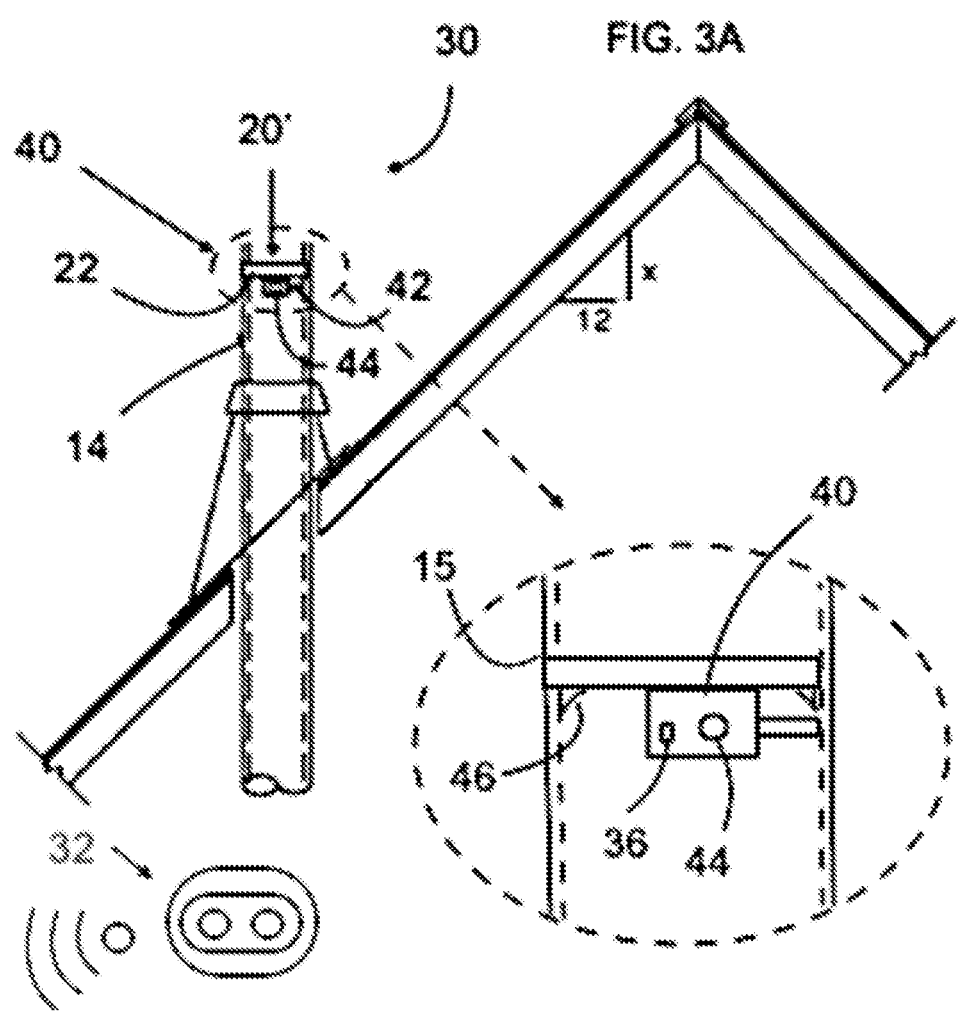

PLUMBING VENT CAP REMOTE REMOVAL SYSTEM

FIELD OF THE INVENTION

The present invention relates generally to plumbing systems. In particular, the present invention relates to a system for use in a plumbing vent pipes during testing of the system. The remote removal system may be conducted by an operator remote to the vent pipe site.

BACKGROUND OF THE INVENTION

Plumbing codes require that plumbing systems be vented through a plumbing vent pipe extending above the building roof. Additionally, codes require a plumbing system to be pressure tested during rough-in inspections, and that a final manometer plumbing test be performed after the plumbing fixtures have been set in place.

Test caps are used for sealing the plumbing system vent pipe during pressure testing. Once testing is completed, the test cap must be removed so that the plumbing vent pipe may provide adequate venting of the installed plumbing system.

Some statutes require that all test caps on plumbing vent pipes be visible from ground level. Such laws were enacted to allow an inspector to see if the test cap was in place and to see if the test cap is removed after final plumbing inspections. Failure to remove plumbing vent pipe test caps results in inadequate or no ventilation of the plumbing system and the air has to escape out one of the other plumbing fixtures.

Many systems exist for capping plumbing roof vents for testing purposes. Such systems include the use of glue on caps, plastic wafers, rubber caps, screw-in plugs, or temporary caps.

All of these prior systems require removal post inspection. Additionally, some of these can fail prior to testing if not secured properly. Some are positioned in places where the inspector can hardly tell from ground level whether the test cap is in place or has been removed and one must climb up onto the building roof to determine this.

In this situation as well as post inspection, getting on a roof with a steep pitch is very undesirable particularly in inclement weather. Currently, after testing is completed, the test cap is removed by climbing onto the roof and mechanically removing the cap by means of a screwdriver or cutting the test cap off.

Additional construction problems exist in installing roof flashing and boot around plumbing vent pipes without breaking an existing cap. A typical plastic test cap system includes gluing a plastic test plug or vent cap over the plumbing vent pipe. Again, in order to remove the test cap, usually the plumber must climb onto the building roof and saw it off. In some applications, the plumber enters the attic and removes the cap by cutting off the part and then putting a new connection in and pushing it through the exiting roof hole which of course leads to leak issues around the dotted boot on the roof. Often times this method requires a plumber to climb a ladder into a restricted attic space resulting in damaged attic insulation and additional time expended in removal of the test cap and clean-up of insulation. Often times, this is done without complying with OSHA requirements, specifically, using a rope and harness to secure their safety. Additionally, there are possibilities that the plumber may forget to clean-out plug, allowing sewer gases to escape into the house. Other means for removing the test exit, but all typically require the plumber to be on site post the structure completion which is months after the plumber's job is essentially completed.

The present invention overcome the deficiencies in the art related to test caps for use in capping a plumbing system vent pipe during the pressure testing of the plumbing system. The present invention allows for easy removal of the equipment after a completed inspection without the need for anyone to climb onto the building roof to remove the test seal part.

SUMMARY OF THE INVENTION

It is an object to improve the system, method and apparatus of pressure testing of the plumbing system.

A further object is to provide a system, method and apparatus for remotely removing pressure testing devices from the plumbing system.

Still another object is to provide a remote control system, method and apparatus for pressure testing of the plumbing system.

Accordingly, the present invention provides a system, method and apparatus for removing a test seal part from a vent positioned on a roof of a structure and being removable without requiring a person on site to accomplish the same. The test seal part includes an surface for connection to aid in removal.

The system, method and apparatus for removing a test seal part from a plumbing vent pipe includes seal part removably sealably connected to the plumbing vent pipe, and a remote controlled apparatus for removing the test seal part. In one embodiment, the remote controlled apparatus includes an unmanned aerial vehicle (UAV) which is a remote controlled aircraft (e.g. flown by a pilot at a ground control station) or can fly autonomously based on pre-programmed flight plan or more complex dynamic automation systems, wherein the UAV is equipped with means for removing the seal part from the plumbing vent pipe post inspection.

In a preferred version, it is envisioned the seal part includes a connection removal surface to which the means for removing connects for removal. The means for removing can include a tool for connection to the connection removal surface. In an embodiment, the tool can include a hook and the connection removal surface can include an eyelet.

In another embodiment, the remote controlled apparatus includes a battery powered actuator having a receiver operably disposed adjacent said seal part in manner to actuate the seal part out of sealable connection with the vent pipe and a remote control for sending a signal to the receiver causing actuation of the seal part out of sealed connection.

Still another aspect of the invention is to provide a locating device, such as an identification chip, such as an NFC chip, in the seal part and providing the UAV with a complementary locating device, such as an NFC locating device, for aiding in removal of the seal part.

Additionally, the there can be provided transducer which permits transmission of signal corresponding to pressure and is operably connected to the battery and wherein the sensed pressure can be transmitted.

To remove the seal part, the remote controlled apparatus is initiated connecting to the seal part causing the seal part to be moved breaking a seal with the vent pipe to permit air to pass through the vent pipe.

The second end of the retrieval device has a retrieval section for forcibly engaging the handle of the apparatus, causing the test plug body to fracture about the periphery.

The apparatus is then removed from the vent without requiring access to the roof and/or vent location. Upon retrieval, the test plug body is removed from the apparatus and a new test plug may then be used with the apparatus.

BRIEF DESCRIPTION OF THE DRAWINGS

FIG. 3A depicts another embodiment of the invention in a test (closed) mode.

DETAILED DESCRIPTION OF PREFERRED EMBODIMENTS

Figure 1:
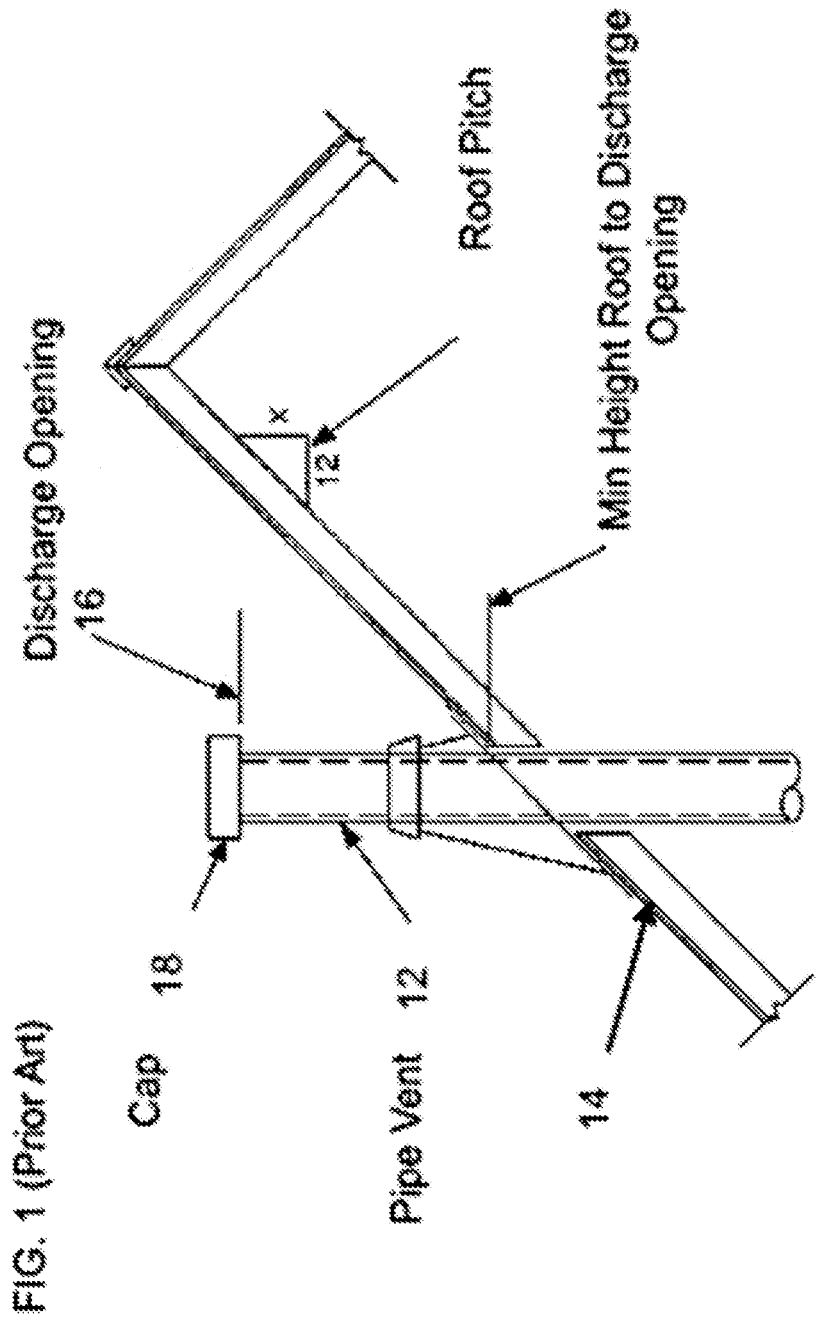
FIG. 1 is a schematic of a typical vent pipe extending from a roof of a building.

Referring now to the drawings, a system for removing a test seal part from a vent positioned on a roof of a structure and being removable without requiring a person on site to accomplish the same is generally referred to by the numeral 10. As noted in FIG. 1 Prior Art, there is provided a vent pipe 12 which extends through a roof 14 which, by conventional code, extends a minimum height from the roof 14 to a discharge opening 16. The vent pipe 12 includes a test cap 18 which is conventionally sealed in a fixed way (typically epoxy) until a standardized pressure test is conducted. Once the pressure test is conducted, the test cap 18 is removed as previously described above by cutting or otherwise knocking it off the pipe.

Figure 2:
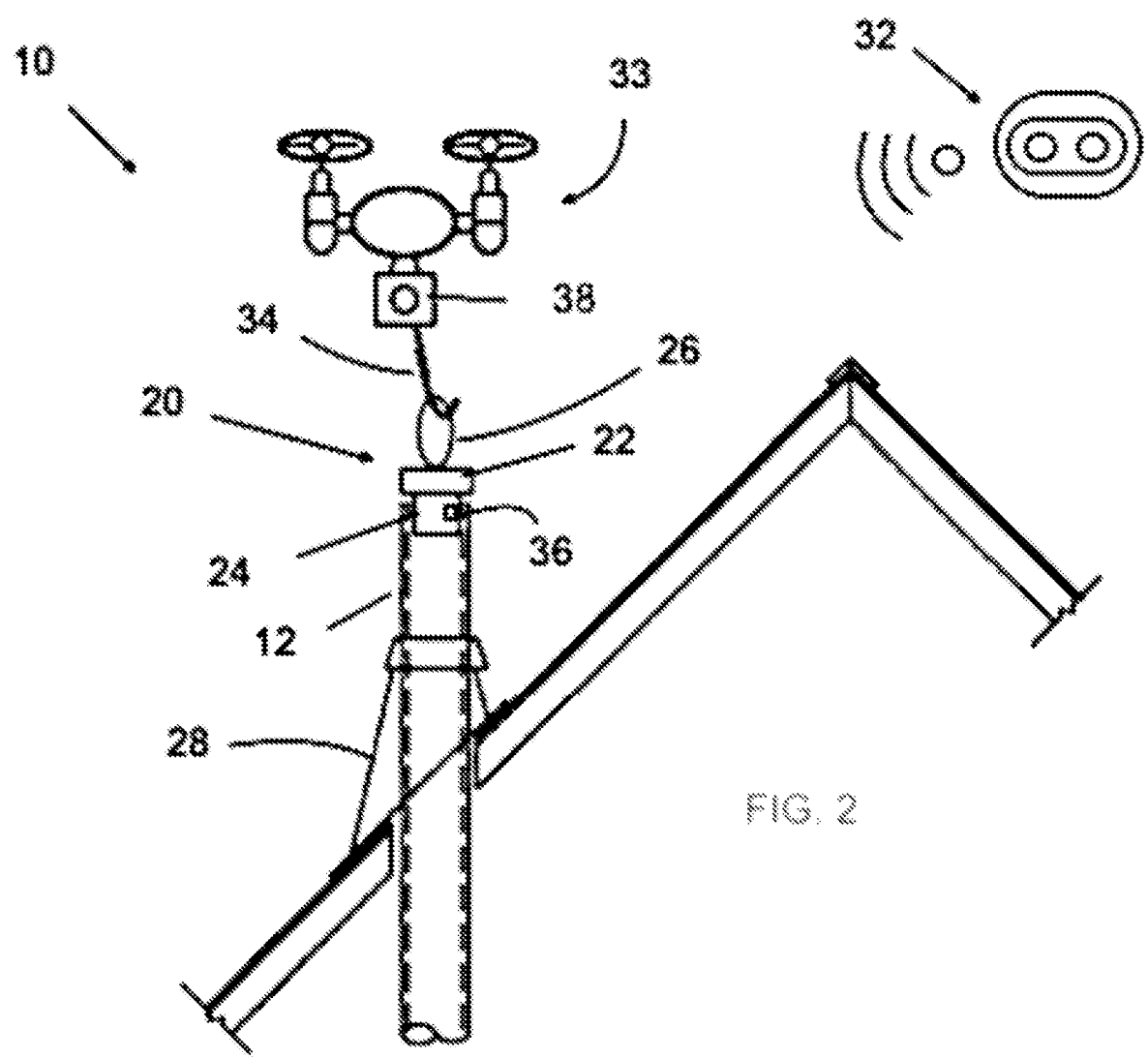
FIG. 2 depicts an embodiment of the invention.

As can be seen in the embodiment represented in FIG. 2, the current system 10 has a removable test seal part 20, which can include a test cap 22 having a sealable connectable neck 24 which can have a seal surface to prevent fluid flow thereby, and retains the part 20 in place within the vent pipe 12 to prevent flow therethrough at least up to a predetermined pressure, e.g., 5 lbs and/or vacuum at such pressure.

The test cap 22 can include an attachment surface 26, such as a wire ring or loop 26 made of a suitable strength material and affixed to the test cap 22 and extending from the test cap 22 in a manner to not interfere with the installation of a boot 28.

A remote controlled apparatus 30 in conjunction with a remote controller 32 is provided for removing the test seal part 20. In this embodiment, the remote controlled apparatus 30 includes an unmanned aerial vehicle (UAV) 33 which is remote controlled aircraft (e.g. flown by a pilot at a ground control station) or can fly autonomously based on pre-programmed flight plan or more complex dynamic automation systems by remote controller 32 such as a computer based, wherein the UAV 33 is equipped with means for removing 34 (a hook) the test seal part 20 from the plumbing vent pipe 12 post inspection.

In a preferred version, it is envisioned the test seal part 20 includes a connection removal surface 26, such a looped cable or other open surface formed on the cap 22, to which the means for removing 34 connects for enabling removal. The means for removing 34 can include hook or other tool such as a robotic arm for connection to the connection removal surface 26.

Figure 3B:
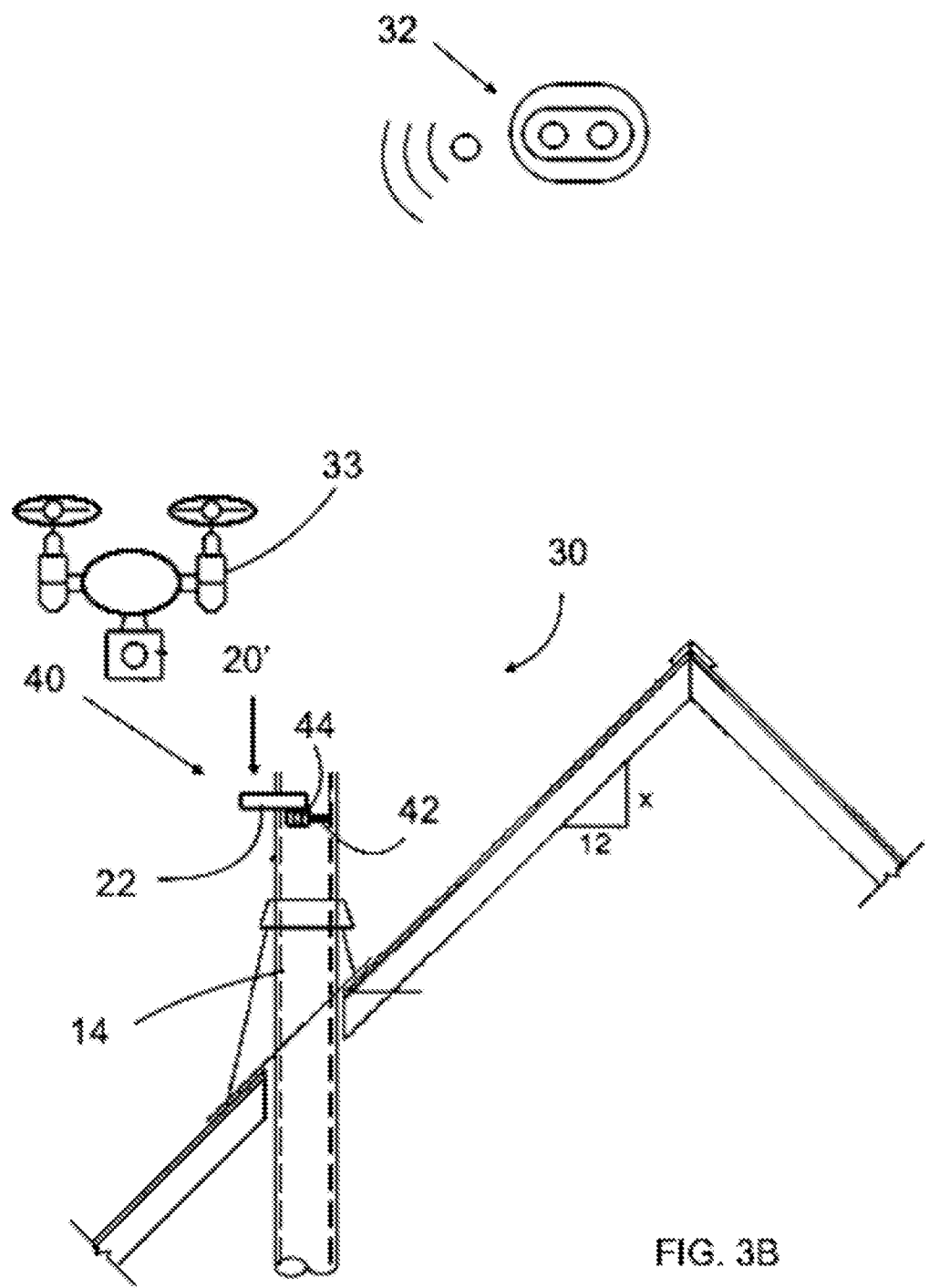
FIG. 3b depicts the embodiment in FIG. 3A in a post test (open) mode.

In another embodiment as seen in FIGS. 3A and 3B, the remote controlled apparatus 33 includes a battery powered actuator 40. For example, the actuator can include a solenoid which comprises electromagnets made of a coil of copper wire with an armature 42 (a slug of metal) in the middle. When the coil is energized, the slug is pulled or pushed as a function of point of connection on the test cap 22 (e.g., a disk which slides through a slot 15 in the pipe 14) connected to the armature into the center of the coil. This makes the solenoid able to pull (from one end) or push (from the other). This solenoid in particular is very small, with a 20 mm long body and a 'captive' armature 42. This means that when activated with 5 VDC, the solenoid moves and then the voltage is removed leaving the disk in a displaced position, which is breaks the seal in the pipe and enables air to escape through the pipe. The actuator 40 can have a receiver 44 operably disposed therewith in manner to actuate the test cap 22 out of sealable connection with the vent pipe 12 by way of remote control 32 for sending a signal to the receiver 44 causing actuation of the test cap 22 out of sealed connection. A seal ring 46 can be provided in the pipe 12 to ensure a seal between the pipe 12 and the test cap 22.

Still another aspect of the invention is to provide a locating device 36, such as an identification chip, such as an NFC chip, in the test seal part 20 and providing the UAV 30 with a complementary locating device 38, such as an NFC locating device, for aiding in removal of the test seal part 20, 20'.

Additionally, it is envisioned there can be provided transducer in the test seal part which permits transmission of signal indicative of a pressure within the pipe and this can be operably connected to the test seal part 20, 20'.

To remove the seal part, the remote controlled apparatus 33 and/or remote control 32 are initiated. Either directly or indirectly the remote controlled apparatus 33 and/or remote control 32 connects to the seal part 20, 20' causing the test cap 22 to be moved breaking a seal with the vent pipe 14 to permit air to pass therethrough.

While the present invention has been illustrated by a description of one or more embodiments and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system for removing a test seal part from a vent positioned on a roof of a structure and being removable without requiring a person on site to accomplish the same, wherein the system includes:

a removable test seal part sealable connected to the vent pipe to flow therethrough and having an attachment surface; and an electronically powered remote controlled apparatus equipped for initiating breaking a seal of said test part and for removing said test seal part.

2. The system of claim 1, wherein said remote controlled apparatus includes an unmanned aerial vehicle (UAV).

3. The system of claim 1, wherein said seal part includes a connection removal surface and a tool for connection to said connection removal surface.

4. The system of claim 3, wherein said tool includes a hook and the connection removal surface includes an eyelet.

5. The system of claim 1, which includes a locating device on said seal part and providing said remote controlled apparatus with a complementary locating device for aiding in location and removal of said seal part.

6. The system of claim 1, wherein said electronically powered remote controlled apparatus includes a battery powered actuator having a receiver operably disposed adjacent said seal part in manner to actuate said seal part out of sealable connection with the vent pipe and a remote control for sending a signal to said receiver causing actuation of said seal part out of sealed connection.

7. The system of claim 1, which includes a transducer for transmission of a pressure signal indicative of pressure in the vent pipe.

8. A method for removing a test seal part from a vent positioned on a roof of a structure and being removable without requiring a person on site to accomplish the same, wherein the method includes:
   disposing a removable test seal part in a sealable connected manner to the vent pipe to flow therethrough and having an attachment surface,
   employing an electronically powered remote controlled apparatus equipped for initiating breaking a seal of said test part and for removing said test seal part, and wherein said remote controlled apparatus includes a battery powered actuator having a receiver operably disposed adjacent said seal part in manner to actuate said seal part out of sealable connection with the vent pipe and a remote control for sending a signal to said receiver causing actuation of said seal part out of sealed connection.

9. The method of claim 8, wherein said remote controlled apparatus includes an unmanned aerial vehicle (UAV).

10. The method of claim 8, wherein said seal part includes a connection removal surface and a tool for connection to said connection removal surface.

11. The method of claim 10, wherein said tool includes a hook and the connection removal surface includes an eyelet.

12. The method of claim 8, which includes a locating device on said seal part and providing said remote controlled apparatus with a complementary locating device for aiding in location and removal of said seal part.

13. The method of claim 8, which includes a transducer for transmission of a pressure signal indicative of pressure in the vent pipe.

14. An apparatus for removing a test seal part from a vent positioned on a roof of a structure and being removable without requiring a person on site to accomplish the same, wherein the apparatus includes:
   a removable test seal part sealable connected to the vent pipe to flow therethrough and having an attachment surface; and
   an electronically powered remote controlled apparatus equipped for initiating breaking a seal of said test part and for removing said test seal part, wherein said remote controlled device includes a battery powered actuator having a receiver operably disposed adjacent said seal part in manner to actuate said seal part out of sealable connection with the vent pipe and a remote control for sending a signal to said receiver causing actuation of said seal part out of sealed connection.

15. The apparatus of claim 14, wherein said remote controlled device includes an unmanned aerial vehicle (UAV).

16. The apparatus of claim 14, wherein said seal part includes a connection removal surface and a tool for connection to said connection removal surface.

17. The apparatus of claim 14, wherein said tool includes a hook and the connection removal surface includes an eyelet.

18. The apparatus of claim 14, which includes a locating device on said seal part and providing said remote controlled device with a complementary locating device for aiding in location and removal of said seal part.

19. The apparatus of claim 14, which includes a transducer for transmission of a pressure signal indicative of pressure in the vent pipe.

* * * * *